(12) United States Patent
Abbott et al.

(10) Patent No.: US 7,848,928 B2
(45) Date of Patent: *Dec. 7, 2010

(54) OVERRIDING DEFAULT SPEECH PROCESSING BEHAVIOR USING A DEFAULT FOCUS RECEIVER

(75) Inventors: Lisa Abbott, Delray Beach, FL (US); Daniel E. Badt, Atlantis, FL (US); John W. Eckhart, Boca Raton, FL (US); Harvey M. Ruback, Loxahatchee, FL (US); Steven G. Woodward, Thousand Oaks, CA (US)

(73) Assignee: Nuance Communications, Inc., Burlington, MA (US)

( * ) Notice: Subject to any disclaimer, the term of this patent is extended or adjusted under 35 U.S.C. 154(b) by 586 days.

This patent is subject to a terminal disclaimer.

(21) Appl. No.: 11/201,003

(22) Filed: Aug. 10, 2005

(65) Prior Publication Data

US 2007/0038462 A1  Feb. 15, 2007

(51) Int. Cl.
*G10L 20/00* (2006.01)

(52) U.S. Cl. .................. 704/275; 709/227; 719/318; 715/767; 715/802

(58) Field of Classification Search .............. 704/275; 709/227; 719/381, 318; 715/767, 802
See application file for complete search history.

(56) References Cited

U.S. PATENT DOCUMENTS

| | | | | |
|---|---|---|---|---|
| 5,491,824 | A * | 2/1996 | Koshi | 710/244 |
| 5,530,868 | A * | 6/1996 | Record et al. | 719/318 |
| 5,801,696 | A * | 9/1998 | Roberts | 715/781 |
| 6,061,709 | A * | 5/2000 | Bronte | 718/103 |
| 6,119,087 | A * | 9/2000 | Kuhn et al. | 704/270 |
| 6,138,099 | A | 10/2000 | Lewis et al. | |
| 6,192,339 | B1 * | 2/2001 | Cox | 704/270 |
| 6,208,972 | B1 * | 3/2001 | Grant et al. | 704/275 |

(Continued)

FOREIGN PATENT DOCUMENTS

EP  1452965 A1 *  9/2004

OTHER PUBLICATIONS

Arons, B.. Hyperspeech: Navigating in Speech-OnlyHypermedia, Proceedings of the ACM InternationalConference on Hypertext, Dec. 1991.*

(Continued)

*Primary Examiner*—Richemond Dorvil
*Assistant Examiner*—Greg A Borsetti
(74) *Attorney, Agent, or Firm*—Wolf, Greenfield & Sacks, P.C.

(57) ABSTRACT

A method for implementing speech focus in a speech processing system can include the step of establishing a default focus receiver as a first entity to request speech focus of a speech processing system having multiple applications that share speech resources based upon speech focus. An event occurrence can be detected. An event handler of the default speech receiver can previously define behavior for the event occurrence and where default system behavior can be implemented within the speech processing system for the event occurrence. The default system behavior can be utilized when speech focus is not assigned during the event occurrence. Responsive to the event occurrence, at least one programmatic action can be performed in accordance with machine readable instructions of the event handler. The default system behavior is not implemented responsive to the event occurrence.

14 Claims, 3 Drawing Sheets

U.S. PATENT DOCUMENTS

| | | | |
|---|---|---|---|
| 6,230,138 B1 * | 5/2001 | Everhart | 704/275 |
| 6,233,559 B1 * | 5/2001 | Balakrishnan | 704/275 |
| 6,240,347 B1 * | 5/2001 | Everhart et al. | 701/36 |
| 6,308,158 B1 * | 10/2001 | Kuhnen et al. | 704/275 |
| 6,314,402 B1 * | 11/2001 | Monaco et al. | 704/275 |
| 6,347,296 B1 | 2/2002 | Friedland | |
| 6,456,974 B1 * | 9/2002 | Baker et al. | 704/270.1 |
| 6,510,411 B1 * | 1/2003 | Norton et al. | 704/254 |
| 6,584,439 B1 * | 6/2003 | Geilhufe et al. | 704/270 |
| 6,732,074 B1 | 5/2004 | Kuroda | |
| 6,754,627 B2 | 6/2004 | Woodward | |
| 6,975,629 B2 * | 12/2005 | Welin | 370/392 |
| 7,043,729 B2 * | 5/2006 | Lewis | 718/103 |
| 7,085,723 B2 * | 8/2006 | Ross et al. | 704/275 |
| 7,133,830 B1 * | 11/2006 | Hoban et al. | 704/270.1 |
| 7,139,713 B2 * | 11/2006 | Falcon et al. | 704/270 |
| 7,167,831 B2 * | 1/2007 | Falcon et al. | 704/275 |
| 7,197,331 B2 * | 3/2007 | Anastasakos et al. | 455/557 |
| 7,228,275 B1 * | 6/2007 | Endo et al. | 704/235 |
| 7,287,248 B1 * | 10/2007 | Adeeb | 717/136 |
| 7,295,116 B2 * | 11/2007 | Kumar et al. | 340/572.1 |
| 7,302,392 B1 * | 11/2007 | Thenthiruperai et al. | 704/251 |
| 7,334,050 B2 * | 2/2008 | Zondervan et al. | 709/246 |
| 7,356,472 B2 * | 4/2008 | Cross et al. | 704/270.1 |
| 7,448,042 B1 * | 11/2008 | Engber et al. | 719/313 |
| 7,454,472 B2 * | 11/2008 | Szeto | 709/206 |
| 7,472,067 B2 * | 12/2008 | Mathur et al. | 704/270 |
| 7,487,440 B2 * | 2/2009 | Gergic et al. | 715/234 |
| 2002/0123892 A1 | 9/2002 | Woodward | |
| 2002/0123894 A1 | 9/2002 | Woodward | |
| 2002/0133354 A1 * | 9/2002 | Ross et al. | 704/275 |
| 2002/0198719 A1 * | 12/2002 | Gergic et al. | 704/270.1 |
| 2003/0021400 A1 * | 1/2003 | Grandgent et al. | 379/202.01 |
| 2003/0144846 A1 * | 7/2003 | Denenberg et al. | 704/277 |
| 2003/0171929 A1 * | 9/2003 | Falcon et al. | 704/275 |
| 2003/0177013 A1 * | 9/2003 | Falcon et al. | 704/275 |
| 2003/0191865 A1 * | 10/2003 | De Armas et al. | 709/310 |
| 2004/0021899 A1 * | 2/2004 | Jost et al. | 358/1.15 |
| 2004/0044516 A1 * | 3/2004 | Kennewick et al. | 704/5 |
| 2004/0117803 A1 * | 6/2004 | Srivastava et al. | 719/318 |
| 2004/0141012 A1 * | 7/2004 | Tootill | 345/827 |
| 2004/0230637 A1 * | 11/2004 | Lecoueche et al. | 709/200 |
| 2005/0097577 A1 * | 5/2005 | Mathur et al. | 719/328 |
| 2005/0137875 A1 * | 6/2005 | Kim et al. | 704/270.1 |
| 2005/0154591 A1 * | 7/2005 | Lecoeuche | 704/270.1 |

OTHER PUBLICATIONS

N. Reithinger, J. Alexandersson, T. Becker, A. Blocher, R. Engel, M. Lockelt, J. Muller, N. Pfeger, P. Poller, M. Streit, and V. Tschernomas. SmartKom: Adaptive and Flexible Multimodal Access to Multiple Applications. In Proc. of the 5th Int. Conf. on Multimodal Interfaces, Vancouver, Canada, 2003. ACM Press.*

Steve Kleiman, Joe Eykholt, Interrupts as threads, ACM SIGOPS Operating Systems Review, v.29 n.2, p. 21-26, Apr. 1995.*

Wang. H, Speech Recognition Engine for Interactive Voice Response application on Windows. Dec. 2001.*

Kuhn et al. Hybrid In-Car Speech Recognition for Mobile Multimedia Applications. 1999. IEEE.*

Wang, K. An Event Driven model for Dialogue Systems. in ICSLP. 1998. Sydney, Australia.*

J. Axelsson, C. Cross, J. Ferrans, G. McCobb, T. V. Raman, and L. Wilson. XHTML+Voice Profile 1.2. Technical report, Mar. 2004. Available online http://www.voicexml.org/specs/multimodal/x+v/12/.*

Shane McCarron, Steven Pemberton, and T. V. Raman. Xml events: An events syntax for xml. Recommendation, W3C, Oct. 2003. URL http://www.w3.org/TR/2003/REC-xml-events-20031014.*

Kleindienst et al. "Loosely-coupled approach towards multi-modal browsing" 2003.*

Chiu et al. "ADOME-WFMS: Towards Cooperative Handling of Workflow Exceptions" 2001.*

* cited by examiner

OVERRIDING DEFAULT SPEECH PROCESSING BEHAVIOR USING A DEFAULT FOCUS RECEIVER

BACKGROUND

1. Field of the Invention

The present invention relates to the field of speech processing and, more particularly, to overriding default speech processing behavior using a default focus receiver.

2. Description of the Related Art

Speech processing resources are often shared by multiple different users and/or applications. Whenever multiple applications share speech resources, some mechanism is needed to coordinate the use of mutually exclusive resources associated with speech processing. Conventional teachings share speech resources based upon a speech focus mechanism. The speech focus mechanism permits an application having the speech focus to use shared speech resources. Once the speech processing task is performed by the application having the speech focus, the speech focus can be passed to another, different application that has a speech processing need. A waiting queue can be established for obtaining the speech focus, wherein applications having a speech processing need are placed in the waiting queue.

When no speech applications are demanding the speech focus, such as when no speech-enabled applications are active, the speech processing system reliant upon speech focus can be placed in an ambiguous state. To resolve these ambiguous states, system designers provide fixed, default behaviors that are applied when no speech applications are active. Unfortunately, system integrators are unable to alter the default behaviors of the speech processing systems. Thus system integrators are often unable to customize or tailor the behavior of speech enabled systems in an optimal manner for their particular circumstances. A simple mechanism is needed to resolve this problem, which preferably does not require a substantial infrastructure overhaul to systems that otherwise operate in an effective manner.

SUMMARY OF THE INVENTION

An extensible design that permits system designers, system integrators, and application writers to modify default behaviors of speech processing systems having multiple applications that share speech processing resources in accordance with an embodiment of the inventive arrangements disclosed herein. More specifically, a default focus receiver (DFR) can be established, which can be placed at the bottom of a focus queue when a speech system is initialized. This allows the DFR to receive focus, error messages, and recognition results when no other application holds the focus. To override default system behavior, a system integrator, application writer, and/or system designer can write a handler and link the handler to the DFR. Since the DFR executes before the normal system default behaviors, the handler linked to the DFR effectively overrides the default behaviors.

The present invention can be implemented in accordance with numerous aspects consistent with material presented herein. For example, one aspect of the present invention can include a method for implementing speech focus in a speech processing system. The method can include the step of establishing a default focus receiver as a first entity to request speech focus of a speech processing system having multiple applications that share speech resources based upon speech focus. An event occurrence can be detected. An event handler of the default speech receiver can previously define behavior for the event occurrence and where default system behavior can be implemented within the speech processing system for the event occurrence. The default system behavior can be utilized when speech focus is not assigned during the event occurrence. Responsive to the event occurrence, at least one programmatic action can be performed in accordance with machine readable instructions of the event handler. The default system behavior is not implemented responsive to the event occurrence.

Another aspect of the present invention includes a system for speech processing. The system can include speech processing resources for performing at least one speech processing task. A plurality of applications can utilize the speech processing resources. Utilization of the speech processing resources by the applications can require that a utilizing application obtain a speech focus. The system can also include a waiting queue for assigning speech focus. The waiting queue can queue entries for waiting ones of the applications. The waiting queue can also include an entry for a default focus receiver. Default system behavior can be defined for situations when speech processing events occur when no entries are present within the waiting queue that directs the system in how to handle the events. Speech focus can be assigned to the default focus receiver when no entries associated with the applications are in the waiting queue. Programmatic actions defined using the default focus receiver can override corresponding programmatic actions specified as default system behavior.

Still another aspect of the present invention can include an entity referred to as a default focus receiver. The default focus receiver can receive speech focus to override default speech processing system behavior. The default focus receiver can include a sequence of instructions that are activated responsive to event occurrences before instructions corresponding to default speech processing behavior are activated. The sequence of instructions is only activated when a speech focus has not been obtained by any of a variety of speech-enabled applications that request speech processing resources responsive to the event occurrences. At least one event handler can be programmatically referenced by said sequence of instructions. The event handler can specify at least one programmatic action that is to be performed responsive to one of the event occurrences being detected. When events occur that have associated event handler programmatic actions and default behavior, the programmatic actions specified in the event handler override the default behavior.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
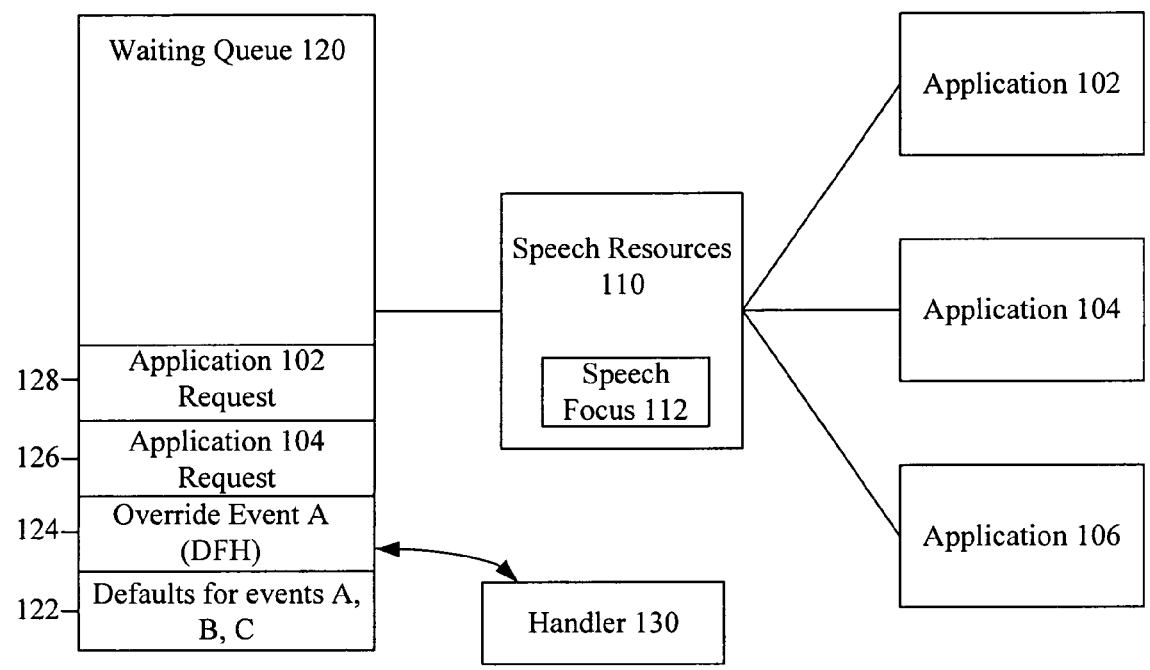
FIG. 1 is a schematic diagram of a speech system having multiple applications that share speech resources in accordance with an embodiment of the illustrative arrangements disclosed herein.

FIG. 1 is a schematic diagram of a speech system 100 having multiple applications (applications 102, 104, 106) that share speech resources 110 in accordance with an embodiment of the illustrative arrangements disclosed herein. System 100 can represent any of a variety of speech processing systems.

In one embodiment, system 100 can be an embedded system. The embedded system can be a resource constrained device operating in a networked or stand-alone fashion. The embedded system can be a system having limited input/output peripherals. The embedded system can lack a keyboard, mouse, and/or display and can therefore rely upon speech input and output to interface with a user. The embedded computing system can be a system customized at design time for a designated purpose as opposed to a generalized computing device designed to be loaded with software that changes its purpose over time. The system can provide one or more of the speech resources 110 as part of a defined architecture or toolkit, such as the IBM EMBEDDED VIAVOICE MULTI-APPLICATION ARCHITECTURE or the EMBEDDED VIAVOICE MAA TOOLKIT, both products of International Business Machines Corporation (IBM) of Armonk, N.Y.

The embedded system can represent a dictation system, a navigation system, a mobile communication device, an electronic day planner, an embedded in-vehicle system, a telematics system, or a media player. Additionally, the embedded system can include a wearable computing device, a mobile computing device, a set-top computing appliance, a subsystem of a larger electric device or system, and the like. At least a portion of the computer readable instructions for applications 102, 104, and 106 and/or for speech resources 110 can be stored within read-only-memory (ROM).

System 100 is not limited to embedded systems and other arrangements are contemplated. For example, system 100 can represent a desktop, laptop, or server having stored thereupon software for application 102, 104, and/or 106. System 100 can also include a distributed computing environment, where one or more of application 102, 104, and 106, as well as speech resources 110 can be located in geographically diverse locations that are communicatively linked with one another through an Internet-protocol based connection.

Regardless of implementation specifics, applications 102, 104 and 106 can be speech-enabled applications that utilize one or more of the speech resources 110. The speech resources 110 can include hardware resources, software resources, network resources, and the like. At least a portion of the speech resources 110 can be mutually exclusive resources that can only be used by a limited number of applications at the same time. The mutually exclusive resources can be discrete, stand-alone resources as well as a cluster or pool of common resources. The limited number of applications able to simultaneously utilize the mutually exclusive resources can have a cardinality of one or more, with multiple applications commonly utilizing pooled resources in accordance with the size of the pool and the nature of the resource utilization.

A speech focus 112 can be established to determine which of the applications 102, 104, and/or 106 can utilize a speech resource 110 or group of speech resources 110. In one arrangement, a single speech application (102-106) having speech focus can "lock in" the speech resources 110 for as long as the application retains speech focus. In another arrangement, individual speech resources 110 can be associated with different speech focuses, where the applications 102-106 can separately acquire selected ones of the speech focuses depending upon the speech resources needed.

A waiting queue 120 can be established for obtaining speech focus 112. Any queuing technique known in the art can be implemented for the waiting queue 120 including prioritization techniques. For instance a first-in-first-out, first-in-last-out, and weighted queue priority schemes can be utilized. When no elements are included in the waiting queue, default behavior 122 can be activated. The default focus receiver 124 can be the first element that is placed in the focus queue, and is therefore executed above the default behavior 122. While the speech processing system 100 is executing, the default focus receiver 124 can be available at the bottom of the waiting queue 120. Any application requesting speech focus can be granted priority in the waiting queue over the default focus receiver 124. For example, the waiting queue 120 can include an initial request for speech focus from application 102, resulting in element 128 being placed in waiting queue 120. A subsequent request from application 104 can result in element 126 being placed in waiting queue 120.

In one embodiment, waiting queue 120 and speech focus 112 establish an order for handling speech processing events. For example, assume that the waiting queue establishes an order for handling speech processing events of application 102, 104, 106, default focus handler 124, then system defaults. Assuming speech event X occurs, then because of the order established by waiting queue 120, application 102 will first be permitted to handle event X. Therefore, if application 102 chooses (as determined by return codes associated with application 102's event handler) to handle event X, application 102 will be granted speech focus 112 for event X. If application 102 chooses not to handle event X, application 104 will be permitted to choose to whether to handle the event, where if it so chooses, application 104 will be granted the speech focus 112. Otherwise, application 106 will be permitted the choice to handle event X, followed by the default focus handler 124, followed by system defaults.

In one embodiment, the elements within waiting queue 120 (including default focus receiver 124) can be implemented as processing threads of execution. These low level processing threads can be used to handle event occurrences relating to utilization of speech resources 110 responsive to the occurrences of speech processing related events. Accordingly, the default focus receiver 124 can be implemented as a pseudo-application that operates as a thread within system 100. Unlike other processing threads that are dynamically created and destroyed upon execution, the default focus receiver 124 can remain active without being destroyed after use for as long as system 100 is in an operational state.

Code within default focus handler 124 can be linked to handlers 130. The handlers 130 can be written by system designers, system implementers, authorized administrative software technicians, and/or other system users. The handlers 130 can specify behavior for events. This specified behavior can override default behavior 122. For example, if handler 130 is written to handle event A, it will override the default for event A contained within the default behavior 122. If no overriding code exists within any of the handlers 130 linked to the default focus receiver 124, actions specified as default behavior 122 can execute. For example, since no handler 130 has been written for event B, the actions specified as default behavior 122 for event B can be executed responsive to an occurrence of event B.

Figure 2:
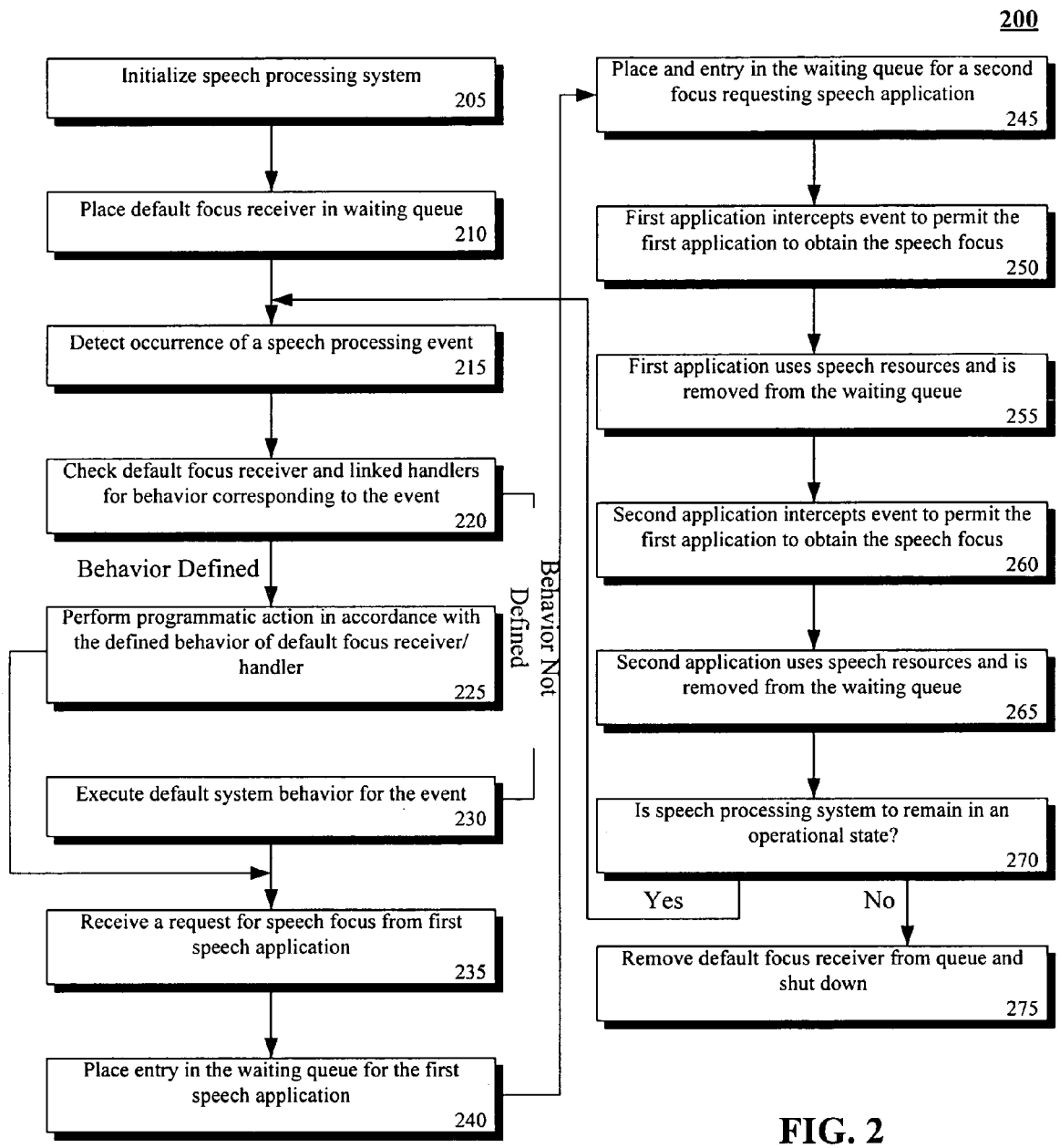
FIG. 2 is a flow chart of a method for utilizing resources in a speech processing system in accordance with an embodiment of the inventive arrangements disclosed herein.

FIG. 2 is a flow chart of a method 200 for utilizing resources in a speech processing system in accordance with an embodiment of the inventive arrangements disclosed herein. The system 200 can be performed in the context of any speech processing system using a speech focus to allocate speech processing resources and that includes a default focus receiver to override default behavior of the speech processing system, when no application competing for speech processing resources has obtained speech focus. For example, the method 200 can be implemented in the context of system 100.

Method 200 can begin in step 205, where a speech processing system can be initialized. In step 210, the default focus receiver can be placed in a waiting queue for speech focus. The default focus receiver can be the first entity to request speech focus and can thusly be placed at the bottom of the waiting queue.

The default focus receiver can override default behavior of the speech processing system. For example, in step 215, an event occurrence can be detected. In step 220, event handlers of the default focus receiver can be checked to determine if any behavior is defined by the default focus receiver for the event. If so, in step 225, at least one programmatic action can be performed in accordance with the behavior defined (within machine readable instructions) by the event handler. If not, in step 230, default system behavior defined for the event occurrence can be executed. Appreciably, when the event handler of the default focus receiver handles the event occurrence, the default system behavior is not implemented having been overridden by the defined behavior of the default focus receiver.

In step 235, a request for speech focus can be received from at least one speech application. In step 240, the speech application can be placed in the waiting queue. In step 245, a second application can request speech focus and can be placed in the waiting queue with a priority in the queue above the default focus receiver and less than the priority of the first speech application. In step 250, the first application can be granted speech focus since it is the first application within the waiting queue (assuming a first-in-first-out (FIFO) queue). Accordingly a speech processing event can be intercepted by the first application and the first application, which has speech focus, can utilize speech processing resources to respond to the intercepted speech processing event. In step 255, when the first application has finished utilizing the resources, the first application can be removed from the waiting queue. In step 260, the second application can intercept an event and obtain speech focus, which allows the second application to utilize associated speech processing resources. In step 265, once the second application has utilized the resources, it too can be removed from the waiting queue.

In step 270, a determination can be made as to whether the speech processing system is to remain in an operational state. If not, the method can proceed to step 275, where the default focus receiver can be removed from the waiting queue, and the system can shut down. It should be noted that the default focus receiver can remain active within the bottom of the waiting queue whenever the speech processing system is operational. If the system is not to be shut down, the method can loop from step 270 to step 215.

Figure 3:
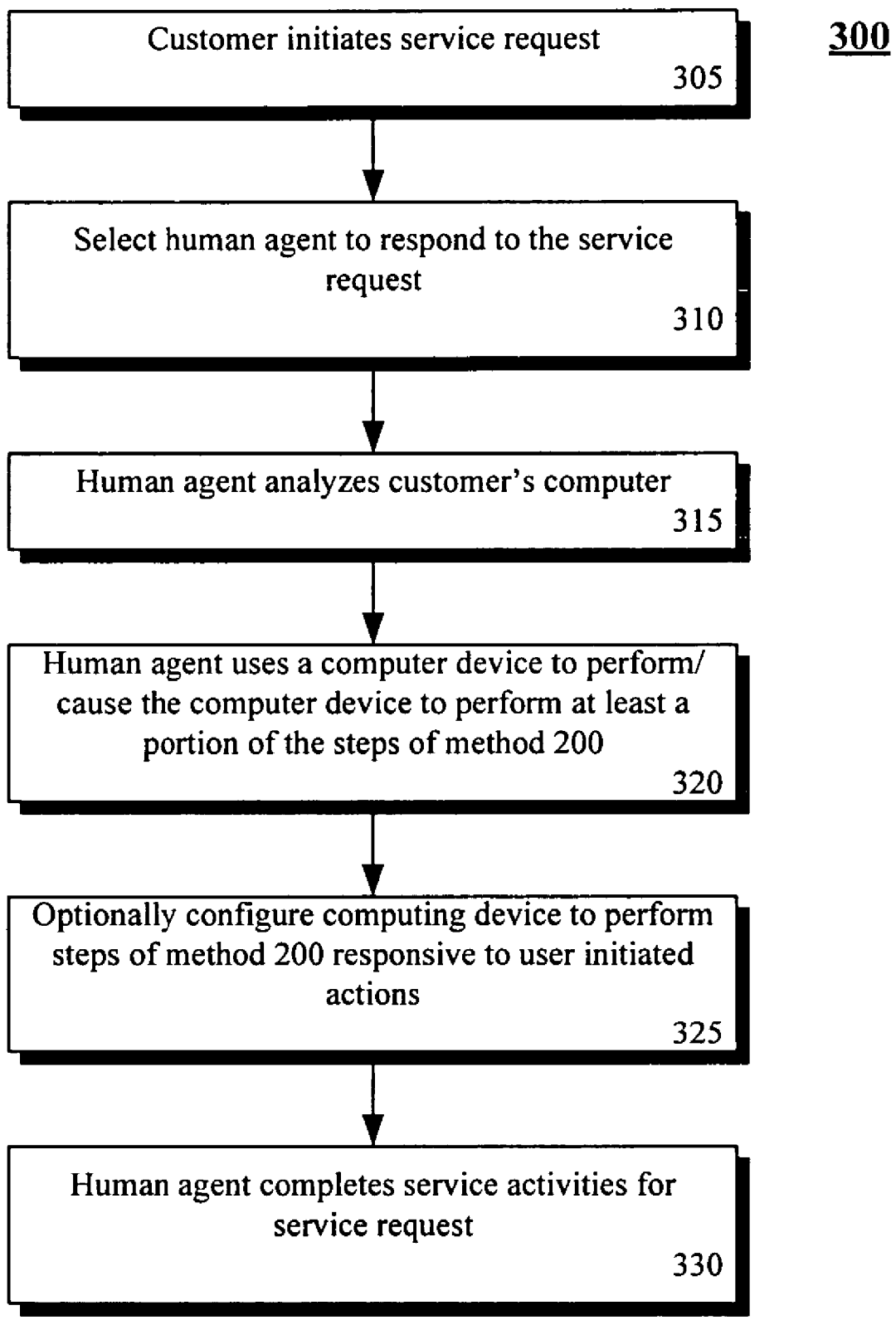
FIG. 3 is a flow chart for a method in which a human agent can perform one or more of the steps of the method of FIG. 2 in accordance with the inventive arrangements disclosed herein.

FIG. 3 is a flow chart for a method 300 in which a human agent can perform one or more of the steps of method 200 in accordance with the inventive arrangements disclosed herein. Method 300 can begin in step 305, where a customer can initiate a service request. The service request can, for example, be a request for a service agent to establish, configure, and/or adjust a speech processing system in accordance with a customer's desires.

In step 310, a human agent can be selected to respond to the service request. In step 315, the human agent can analyze the customer's computer/speech processing system. System analysis work can also be performed to determine optimal settings. In step 320, the human agent can use one or more computing devices to perform or to cause the computer device to perform the steps of method 200. For example, the human agent can be responding to a trouble call and can test the established functionality of the customer's system, which can have a default focus receiver enabled. The human agent can also train the customer in the use of the speech processing system using the customer's own hardware.

In optional step 325, the human agent can configure the customer's computer in a manner that the customer can perform the steps of method 200 in the future. For example, the human agent can install software to enable the default focus receiver. The human agent can also write event handlers linked to the default focus receiver to override the default behavior of the speech processing system. Additionally, the human agent can create links within the default focus receiver to one or more default handlers, which the customer can configure and/or write. Once the customer's machine has been configured by the human agent, the newly configured machine can perform the steps of method 200 responsive to customer initiated actions. In step 330, the human agent can complete the service activities having resolved the problem for which the service request was placed or otherwise responded to the service request.

It should be noted that while the human agent may physically travel to a location local to the customer's computer when responding to the service request, physical travel may be unnecessary. For example, the human agent can use a remote agent to remotely manipulate the customer's computer system in the manner indicated in method 300.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof.

Accordingly, reference should be made to the following claims, rather than to the foregoing specification, as indicating the scope of the invention.

What is claimed is:

1. A method of using a speech focus to allocate speech processing resources in a speech processing system comprising at least one electronic processor, the speech processing system having a plurality of speech-enabled applications that share speech processing resources of the speech processing system, the plurality of speech-enabled applications gaining access to the speech processing resources only after obtaining the speech focus, the method comprising:
    establishing a waiting queue adapted to order in priority requests from any of the plurality of speech-enabled applications waiting to obtain the speech focus;
    establishing a default focus receiver to override at least some default speech behavior of the speech processing system;
    placing the default focus receiver in the waiting queue at a priority level above the default speech behavior, such that when none of the plurality of speech-enabled applications are requesting the speech focus the default focus receiver obtains the speech focus;
    detecting a speech processing event occurrence requiring an allocation of at least a portion of the shared speech processing resources;
    if the waiting queue does not include requests from any of the plurality of speech-enabled applications, determining whether the default focus receiver comprises an event handler having override behavior for occurrence of the speech processing event;
    performing at least one speech processing action in accordance with machine-readable instructions of the event handler if the event handler is determined to have override behavior for occurrence of the speech processing event occurrence; and
    performing at least one speech processing action in accordance with machine-readable instructions defining the default speech behavior if the event handler is determined not to have override behavior for occurrence of the speech processing event.

2. The method of claim 1, wherein the default focus receiver is active after being initialized for an entire duration that the speech processing system which was initialized is active.

3. The method of claim 1, wherein the default focus receiver is always available near the bottom of the waiting queue associated with the speech focus while the speech processing system is running.

4. The method of claim 1, wherein the event handler is linked to code of the default focus receiver to override the default speech behavior of the speech processing system.

5. The method of claim 1, wherein the default focus receiver is a sequence of instructions that operate within the speech processing system as a thread of execution.

6. The method of claim 1, wherein the speech processing system is an embedded speech processing system, wherein the plurality of speech-enabled applications that compete for the speech focus are stored within read-only-memory of the embedded speech processing system.

7. The method of claim 1, wherein the steps of claim 1 are performed by a machine in accordance with at least one computer program having a plurality of code sections that are executable by the machine.

8. The method of claim 1, wherein the steps of claim 1 are performed by at least one of a service agent and a computing device manipulated by the service agent, the steps being performed in response to a service request.

9. The method of claim 1, wherein the steps of claim 1 are performed by a machine in accordance with a plurality of machine readable instructions that are executed by the machine, and wherein a service agent responding to a service request specifically configures said machine to perform said steps of claim 1.

10. A system of using a speech focus to allocate speech processing resources, the system having a plurality of speech-enabled applications that share speech processing resources of the speech processing system, the plurality of speech-enabled applications gaining access to the speech processing resources only after obtaining the speech focus, the system comprising:
    at least one processor configured to perform the following steps:
        establishing a waiting queue adapted to order in priority requests from any of the plurality of speech-enabled applications waiting to obtain the speech focus;
        establishing a default focus receiver to override at least some default speech behavior of the speech processing system;
        placing the default focus receiver in the waiting queue at a priority level above the default speech behavior, such that when none of the plurality of speech-enabled applications are requesting the speech focus the default focus receiver obtains the speech focus;
        detecting a speech processing event occurrence requiring an allocation of at least a portion of the shared speech processing resources;
        if the waiting queue does not include requests from any of the plurality of speech-enabled applications, determining whether the default focus receiver comprises an event handler having override behavior for occurrence of the speech processing event;
        performing at least one speech processing action in accordance with machine-readable instructions of the event handler if the event handler is determined to have override behavior for occurrence of the speech processing event occurrence; and
        performing at least one speech processing action for generating a speech-based system output in accordance with machine-readable instructions defining default speech behavior if the event handler is determined not to have override behavior for occurrence of the speech processing event.

11. The system of claim 10, wherein the default focus receiver entry is placed within the waiting queue during initialization of the system before other entries are able to be placed within the waiting queue.

12. The system of claim 10, wherein the default focus receiver is a sequence of instructions that operate within the system as a thread of execution.

13. The system of claim 10, wherein the system is an embedded speech processing system, wherein the plurality of speech-enabled applications that compete for the speech focus are stored within read-only-memory of the embedded speech processing system.

14. At least one non-transitory computer readable storage medium encoded with a plurality of instructions that, when executed on at least one processor, perform a method of using a speech focus to allocate speech processing resources in a speech processing system having a plurality of speech-enabled applications that share the speech processing resources of the speech processing system, the plurality of speech-enabled applications gaining access to the speech processing resources only after obtaining the speech focus, the method comprising:
- establishing a waiting queue adapted to order in priority requests from any of the plurality of speech-enabled applications waiting to obtain the speech focus;
- establishing a default focus receiver to override at least some default speech behavior of the speech processing system;
- placing the default focus receiver in the waiting queue at a priority level above the default speech behavior, such that when none of the plurality of speech-enabled applications are requesting the speech focus the default focus receiver obtains the speech focus;
- detecting a speech processing event occurrence requiring an allocation of at least a portion of the shared speech processing resources;
- if the waiting queue does not include requests from any of the plurality of speech-enabled applications, determining whether the default focus receiver defines override behavior for occurrence of the speech processing event;
- performing at least one speech processing action in accordance with machine-readable instructions defined by the default focus receiver if the default focus receiver is determined to have the override behavior for occurrence of the speech processing event occurrence; and
- performing at least one speech processing action in accordance with machine-readable instructions defining default speech behavior if the default focus receiver is determined not to have the override behavior for occurrence of the speech processing event.

* * * * *